United States Patent [19]

Komatsuzaki et al.

[11] Patent Number: 4,958,179
[45] Date of Patent: Sep. 18, 1990

[54] CAMERA WITH CHANGEABLE FOCAL LENGTH

[75] Inventors: Hiroshi Komatsuzaki; Kazuo Kamata, both of Tokyo; Akio Ohmiya; Syunji Nishimura, both of Saitama; Yoshihito Umeda, Yamanashi; Noriya Mochizuki, Yamanashi; Eiji Furuya, Yamanashi, all of Japan

[73] Assignees: Fuji Photo Film Co., Ltd., Kanagawa; Nihon Seimitsu Kogyo Kabushiki Kaisha, Yamanashi, both of Japan

[21] Appl. No.: 291,450

[22] Filed: Dec. 27, 1988

[30] Foreign Application Priority Data

Dec. 25, 1987 [JP] Japan ............................ 62-328806
Dec. 26, 1987 [JP] Japan ........................ 62-198153[U]
Jan. 12, 1988 [JP] Japan ................................ 63-4445

[51] Int. Cl.$^5$ ............................................. G03B 1/18
[52] U.S. Cl. ............................................. 354/195.12
[58] Field of Search ........................ 354/195.1, 195.2

[56] References Cited

U.S. PATENT DOCUMENTS 4,597,657 7/1986 Wakabayashi ............... 354/195.12
4,669,848 6/1987 Wakabayashi ............... 354/195.12
4,789,875 12/1988 Wakabayashi et al. ........ 354/195.12

FOREIGN PATENT DOCUMENTS 60-114836 6/1985 Japan ............................ 354/195.12
60-163010 8/1985 Japan .
61-35435 2/1986 Japan .

Primary Examiner—Brian W. Brown
Attorney, Agent, or Firm—Young & Thompson

[57] ABSTRACT

A focal length changeable camera has a taking lens system which is changed between at least two different focal lengths, namely, a relatively long focal length suitable for a telephotographic mode and a relatively short focal length suitable for a wide-angle photographic mode, and is equipped with a focal length changing mechanism comprising a rotatable changing member driven by a motor, a lever displacing member provided on the rotatable changing member, a motor switching lever engageable with the lever displacing member for switching a motor switch, and a focal length changing member for changing the focal length of the taking lens upon rotation of the rotatable changing member.

23 Claims, 15 Drawing Sheets

CAMERA WITH CHANGEABLE FOCAL LENGTH

BACKGROUND OF THE INVENTION

The present invention relates to a camera with a changeable focal length, and more particularly to a focal length changeable camera equipped with a motor drive mechanism by which a taking lens system is changed in focal length.

Recent compact cameras are equipped with taking lens systems of the type in which the focal length can be changed between various focal lengths, for example between a relatively short focal length of approximately 35 mm suitable for wide-angle photography and a relatively long focal length of approximately 70 mm suitable for telephotography. Such focal length changeable cameras have taking lens systems which generally include an axially movable master lens and an extra lens which is displaced from or moved into the optical path of the taking lens system upon changing the taking lens system to the relatively long focal length.

In one instance of such a focal length changeable camera disclosed in, for example, Japanese Unexam. Patent Publ. No. 60-114,836 there is provided a toggle spring to thrust back and forth the axially movable master lens in the direction of the optical path or to extend it from and retract it into the camera body so as to change the focal length of the taking lens. The provision of such a toggle spring makes focal length changeable cameras simple in structure but needs relatively large force to thrust back and forth the master lens for the change of focal length.

In another instance, as is disclosed in Japanese Unexam. Patent Publs. Nos. 60-163,010 and 61-35,435, a motor for advancing or transporting a film in the camera is commonly used to thrust back and forth the axially movable master lens. The motor is operationally coupled to a movable lens barrel holding the master lens through a one-way clutch comprising, for example, a planetary gearset. Therefore, such motor driven focal length changeable cameras need not only a reverse switch for reversing the motor in rotation but also a self-housing switch for maintaining the motor reversed. In order to control the operation of these switches, it is necessary to provide a mechanism including, for example, cams and levers which will generally make the internal mechanisms of the camera complicated.

Otherwise, the one-way clutch coupling the lens barrel to the motor is maintained coupled by a self-holding member which is brought into operation through an axially movable member in cooperation with the axial movement of the lens barrel. In this instance, the lens barrel will receive undesirable external force exerted thereon at angles to the optical axis of the taking lens system. Such undesirable external force causes the optical axis of the taking lens system to deflect or incline. Therefore, it is necessary to provide means such as rollers for the prevention of such deflection or inclination of the optical axis of the taking lens system.

It is also necessary to provide position sensors such as a limit switch in association with the master lens or its lens barrel in order to detect whether the master lens or the lens barrel is at one of two possible lens positions, or at a position between the possible lens positions, thereby stopping the motor. The provision of such position sensors will also make the internal mechanism of the camera complicated.

Furthermore, it is necessary to provide electrical or mechanical interlock means for preventing a shutter release button or a focal length change member from being operated during the time the focal length change member is being operated to change the focal length of the taking lens system or during the time the shutter release button is being operated, respectively. An electrical interlock means is necessary, which cooperates with a position sensor or sensors such as a limit switch in association with the master lens or its lens barrel in order to detect whether the master lens or the lens barrel is at one of two possible lens positions, or at a position between the possible lens positions, thereby stopping the motor. The provision of such position sensors will also make the internal mechanism of the camera complicated.

OBJECTS OF THE INVENTION

It is, therefore, an object of the present invention to provide a focal length changeable camera which can mechanically hold a motor switch turned on to change focal length.

It is another object of the present invention to provide a focal length changeable camera which has a simple structure for controlling a motor for changing focal length.

It is still another object of the present invention to provide a focal length changeable camera which is provided with a simple mechanical interlock structure for interlocking alternately shutter release and focal length change.

SUMMARY OF THE PRESENT INVENTION

According to a preferred embodiment of the present invention, a focal length changeable camera comprises rotatable changing means driven by a motor; a lever displacing means formed on the rotatable changing means; motor switch control means in the form of a lever cooperating with the lever displacing means; and focal length changing means movable in cooperation with rotation of the rotatable changing means for changing a taking lens system between at least two focal lengths, namely, a relatively long focal length suitable for telephotography and a relatively short focal length suitable for wide-angle photography.

When operating an externally operable slider for changing a taking lens system between telephotographic and wide-angle photographic modes, the motor switch control lever is rotationally displaced to turn on the motor, rotating the rotatable changing means, thereby changing the focal length of the taking lens system through focal length changing means. At this time, the lever displacing means maintains the motor switch lever to hold the motor turned on. The provision of the lever displacing means and the motor switch lever engageable with each other makes it possible to hold the motor switch turned on during the change of focal length.

According to another preferred embodiment of the present invention, a focal length changeable camera with a taking lens system which is driven by a motor to change focal length between at least two different focal lengths comprises a motor switch for turning on and off the motor, a motor switch actuating member for causing the motor switch to turn on and off the motor, a motor control cam member driven by the motor and having activating peripheral cam sections for displacing the motor switch actuating member to cause the motor switch to turn on and deactivating peripheral cam sections for displacing the motor switch actuating member to cause the motor switch to turn off, a member provided on the motor control cam member, a focal length changing member coacting with this member for changing the taking lens system in focal length, and an externally operable focal length changing member for displacing the motor switch actuating member from a position wherein the motor switch actuating member is out of contact with the activating cam section to a position wherein the motor switch actuating member is in contact with the activating cam section.

In this embodiment, an externally operable slider is operated to change focal length. In cooperation with the operation of the external slider, the motor switch actuating member causes the motor switch to turn on, starting the motor to rotate followed by rotation of the motor control cam member. Upon rotation of the motor control cam member, the switch actuating member is displaced from a deactivating cam section of the motor control cam member to an activating cam section of the motor control cam section, thereby holding the motor switch turned on during the focal length change of the taking lens system.

According to still another preferred embodiment of the present invention, a focal length changeable camera is provided with an interlock mechanism. The interlock mechanism desirably comprises shutter release means operated to unlock a shutter actuating member for causing a shutter to operate, focal length changing means for changing the taking lens system between at least the two different focal lengths, an interlock member movable between a first position disabling the focal length changing means from operating and a second position causing the focal length changing means to operate, first restraining means in the interlock member for restraining the interlock member from moving to the second position when the shutter release means is operated, and second restraining means in the interlock member for restraining the shutter release means from being operated when the interlock member is at the second position.

In this embodiment, when a shutter release button is operated or depressed, the shutter release means is displaced to a release position so as to actuate the shutter actuating member, driving a shutter to make an exposure. On the other hand, when a photographic mode shift slider is operated, the interlock member is moved from the first to the second position, causing the focal length changing means to operate, thereby changing the taking lens system from the telephotographic mode to the wide-angle photographic mode.

If the photographic mode shift slider is operated while the shutter release button is depressed, the first restraining means prevents the interlock member from operating, thereby interlocking the focal length changing means. On the other hand, if the shutter release button is depressed during the change of focal length of the taking lens system, the second restraining means prevents the shutter release means from operating, thereby interlocking the shutter actuating means.

DETAILED DESCRIPTION OF THE INVENTION

Figure 1:
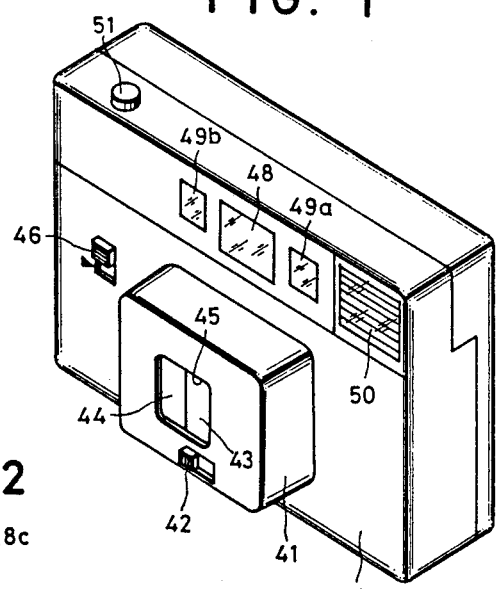
FIG. 1 is a perspective view of a focal length changing camera according to the present invention.

Referring now to FIG. 1, there are shown various necessary elements forming essential parts of a camera changeable in focal length, for example, between two different focal lengths, namely a relatively short focal length suitable for wide-angle photography and a relatively long focal length suitable for telephotography, according to the present invention. It is to be understood that camera elements not specifically shown may take various forms known to those skilled in the art.

As shown, the camera has a lens housing 41 provided on a front wall 40 thereof. Inside of the lens housing 41 there is a lens cover comprising two barrier blades 43 and 44 to open and close an opening 45 of the lens housing 41. The barrier blades 43 and 44 are mechanically operationally connected to an externally operable lens cover opening slider 42 to open and close. The camera body is further provided on the front wall 40 with a T-W mode shift slider 46 for shifting the camera into a wide-angle photographic mode or into a telephotographic mode, a viewfinder window 48, light projecting and light receiving windows 49a and 49b of an automatic focusing device and an electronic flash assembly 50, and on its top wall a shutter release button 51.

Figure 2:
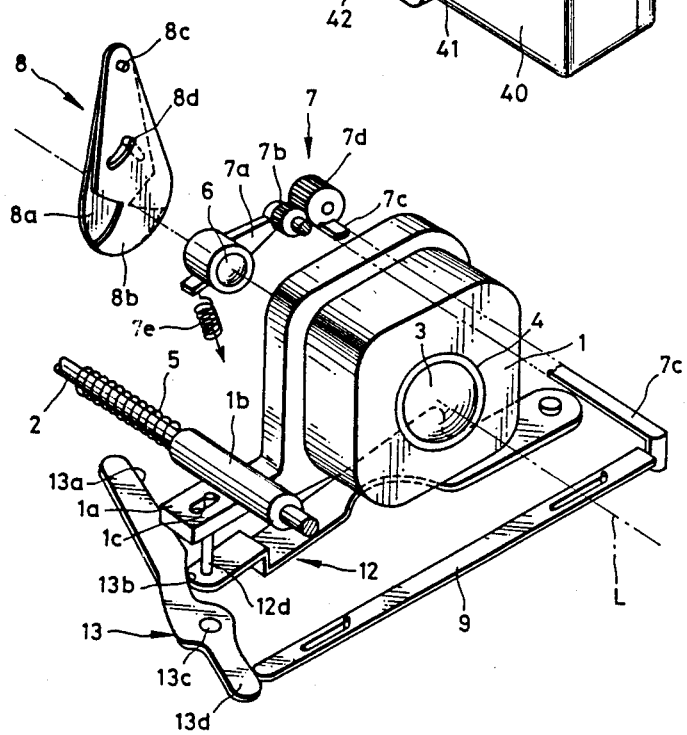
FIG. 2 is an exploded perspective illustration showing an essential part of a focal length changing camera of FIG. 1.

As is shown in FIG. 2, a taking lens system includes a master lens 3 and a conversion lens 6. The master lens 3 is supported by a lens holder 4 which is mounted in a slidable lens barrel 1 and is moved back and forth by the movable lens barrel 1 along the optical axis L of the taking lens system in cooperation with a well-known automatic focusing device (not shown) so as to focus the taking lens system. On one side of the movable lens barrel there is a plate 1a extending laterally therefrom formed with a slot 1c, to which plate 1a a bearing sleeve 1b is secured. The bearing sleeve 1b receives a guide rod 2 extending parallel to the optical axis L of the taking lens system for guiding the back and forth movement of the movable lens barrel 1 between a telephotographic position and a wide-angle photographic position. The guide rod 2 supports thereon a coil spring to force the movable lens barrel 1 toward the telephotographic position.

The conversion lens 6 is inserted into and removed from the optical axis L of the taking lens system by means of a conversion lens shift mechanism 7 in cooperation with the back and forth movement of the movable lens barrel 1. This conversion lens shift mechanism 7 comprises a lens holder 7a holding the conversion lens 6, a driven gear 7b secured to the lens holder 7a and a drive gear 7d in mesh with the driven gear 7b. The lens holder 7a is forced by a spring 7e to turn toward a position wherein the conversion lens 6 is coaxial with the optical axis L of the taking lens system.

Behind the conversion lens 6 there is a shutter 8 comprising two shutter blades 8a and 8b pivotally mounted on a shaft 8c. Each shutter blade 18a, 8b is formed with a curved slot that receives a pin 8d driven by a shutter driving mechanism (which is well known in structure and operation and need not be disclosed in detail herein). Upon up and down movement of the pin 8d, the shutter blades 8a and 8b are swung in opposite directions to open and close. Behind and close to the movable lens barrel 1 there is a diaphragm 62 as shown in FIGS. 3 and 4.

Figure 5:
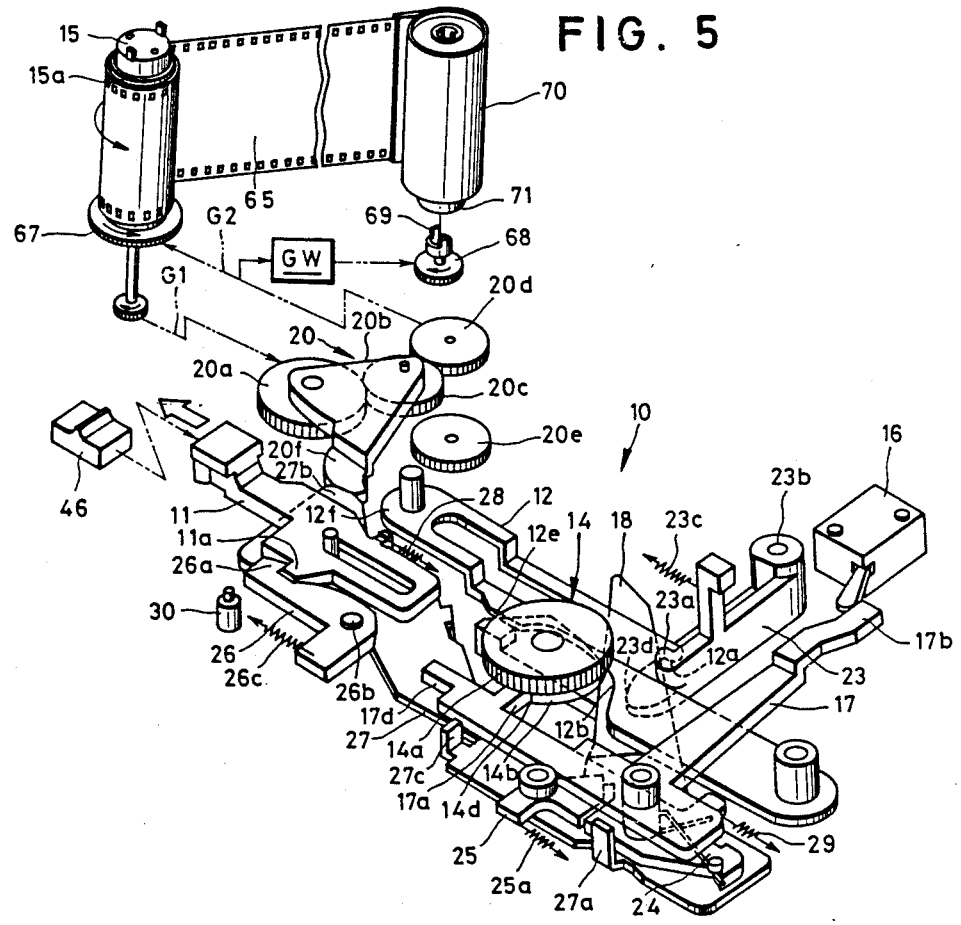
FIG. 5 is a partially exploded perspective view showing a mode shift mechanism of the focal length changeable camera of FIG. 2.

In order to shift the taking lens system between the telephotographic mode and the wide-angle photographic mode by cooperatively moving the master lens 3 and the conversion lens 6, there is a focal length change mechanism 10 (which is hereinafter referred to as a T-W mode shift mechanism). As is shown in FIG. 5, the T-W mode shift mode mechanism 10 includes a first change lever 12 which swings to move back and forth the master lens 3 along the optical axis L and the conversion lens 6 into and out of the optical axis L. As is shown in FIG. 2, in order to cause the conjoint movement of the master and conversion lenses 3 and 6, the first change lever 12 is in contact with a cam surface of a second change lever 13 at its one end and is coupled to the plate 1a through a pin-and-slot 12d-1c engagement. The cam surface of the second change lever 13 comprises two cam sections: a non-displacing cam section 13a which causes no displacement of a slide lever 9 disposed between the second change lever 13 and a swing lever 7c secured to the drive gear 7d, and a displacing cam section 13b which causes the displacement of the slide lever 9. When the movable lens barrel 1 moves back and forth, the axial movement of the first change lever 12 swings the second change lever 13 while the first change lever 12 is in contact with the displacing cam section of the second change lever 13, so that the slide lever 9 is displaced to swing the swing lever 7c, turning the drive gear 7d thereby to insert and remove the lens holder 7a holding the conversion lens 6 from the optical axis L or causes no motion of the second change lever 13, or no swinging of the second change lever 13 while the first change lever 12 is in contact with the non-displacing section of the cam surface of the second change lever 13, so that the slide lever 9 is not displaced.

Figure 3:
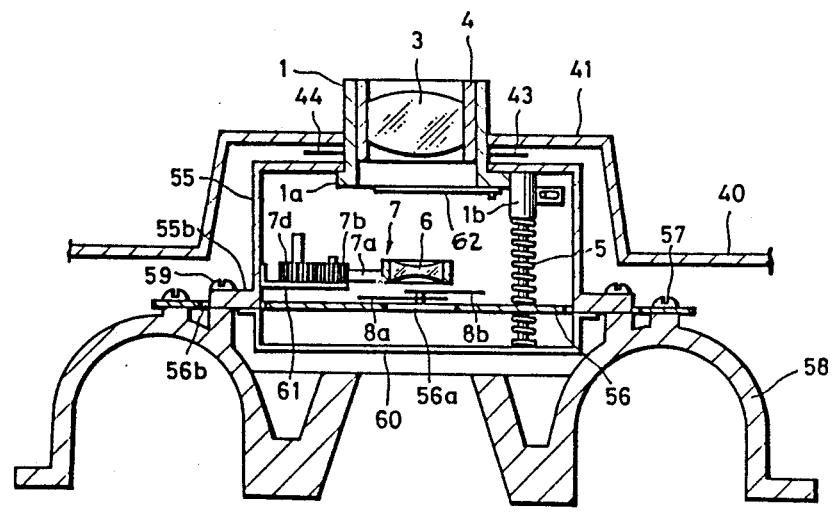
FIG. 3 is a sectional view showing the focal length changeable camera of FIG. 2 in which a taking lens system is in a telephotographic mode.
Figure 4:
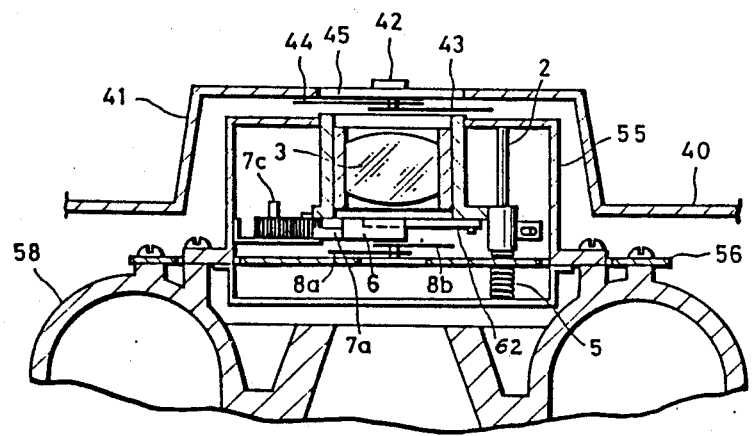
FIG. 4 is a sectional view showing the focal length changeable camera of FIG. 2 in which a taking lens system is in a wide-angle photographic mode.

Referring now to FIGS. 3 and 4, the camera is shown in the telephotographic mode and the wide-angle photographic mode, respectively. As shown, inside the lens housing 41 there is an inner housing 55 which slidably supports the movable lens barrel 1. Disposed between the lens housing 41 and the inner housing 55 are the lens barrier blades 43 and 44 shown in FIG. 1 which are allowed to open and close if the camera is in the wide-angle photographic mode shown in FIG. 4.

The shutter blades 8a and 8b of the shutter 8 are attached to a shutter base plate 56 and open and close an opening 56a formed in the shutter base plate 56. The shutter base plate 56 is formed with four holes 56b for receiving bosses 55b of the inner housing 55 and is secured to the camera body 58 with screws 57. The inner housing 55 is secured to the camera body 58 with screws 59.

Behind the inner housing 55 a retainer plate 60 is attached to the flange of the inner housing 55 and supports the guide rod 2. A bracket 61 is attached to the inside of housing 55 and holds the lens shift mechanism 7.

The operation of the T-W mode shift mechanism 10 will be described in detail with reference to FIGS. 5 through 13. The T-W mode shift slider 46, which coacts with a T-W mode set slider 11 through e.g. a lever (not shown), can be operated to move the T-W mode set slider 11 in a direction shown by an arrow in FIG. 5. The T-W mode shift mechanism 10 includes the above-noted first and second change levers 12 and 13, a shift control cam 14 acting on the first change lever 12, a motor 15 for rotating the shift control cam 14, a motor switch 16 for actuating the motor 15, a switch lever 17 for keeping the motor switch 16 actuated, and a latch-set lever 18 for swinging the switch lever 17 to turn on the motor switch 16.

The motor 15, as was previously described, is common to T-W mode shift operation and to film winding and rewinding and is disposed in a spool 15a on which the film is wound up. Rotation of the motor 15 is transmitted to the switching gear arrangement 20 acting as a clutch through a reduction gear train G1. The switching gear arrangement 20 includes a planetary gear set which comprises a sun gear 20a in mesh with the reduction gear train G1, a carrier 20b mounted coaxially with the sun gear 20a, a planet gear 20c supported for rotation by the carrier 20b and in mesh with the sun gear 20a, a first follower gear 20d with which the planet gear 20c is brought into mesh when the sun gear 20a turns in the counterclockwise direction as viewed in FIG. 5 to turn the carrier 20b, and a second follower gear 20e with which the planet gear 20c is brought into mesh when the sun gear 20a turns in the clockwise direction as viewed in FIG. 5 to turn the carrier 20b.

The carrier 20b of the switching gear arrangement 20 is formed with a detent projection 20f engageable with a projection 27b of the T-W mode set slider 27. When the T-W mode set slider 27 is not operated at its initial position, the projection 27b of the T-W mode set slider 27 is in engagement with the detent projection 20f of the carrier 20b, thereby forcing the carrier 20b to move the planet gear 20c into mesh with the first follower gear 20d. On the other hand, when the T-W mode set slider 27 is operated to move in the opposite direction to that shown by the arrow in FIG. 5, the sun gear 20a turns clockwise to turn planet gear 20c and to disengage the projection 27a of the T-W mode set slider 27 from the detent projection 20f of the carrier 20b, thereby forcing the carrier 20b to move the planet gear 20c into mesh with the second follower gear 20d.

Rotation of the first follower gear 20d is not only directly transmitted to a gear 67 attached to the film wind spool 15a through a gear train G2 but also transmitted to a film rewind gear 68 through a one-way clutch GW in a gear train branched off the gear trains G2. The film rewinding gear 68 has a fork 69 to be coupled to a spool of a patrone containing a roll of film 65 loaded in the camera.

The shift control cam 14 is pivotally mounted on the base plate (not shown) and consists of a toothed section 14a coupled to the second follower gear 20e through a connecting gear train 21, a circular cam section 14b and an off-set pin 14c attached to the back surface of the shift control cam 14. The circular cam section 14b is formed with two peripheral notches 14d at irregular spacings to provide first and second cam surfaces 14e and 14f therebetween as shown in detail in FIGS. 12 and 13. Each notch 14d receives a hook 17a of the switch lever 17. The off-set pin 14c, as will be described in detail later, coacts with the limiting lever 23, the latch-set lever 18 and the first change lever 12 to turn them.

The first change lever 12 is supported for swinging movement by a pivot shaft 12c secured to the base plate and is provided with a detent 12a for restricting forward displacement of the movable lens barrel 1 for changing the camera to the telephotographic mode, and first and second engaging edges 12b and 12e engageable with the off-set pin 14c of the shift control cam 14. The first change lever 12 is urged by the coil spring 5 to turn in a direction to shift the taking lens system into the telephotographic mode. The detent 12a is provided with a pivot shaft 23b which pivotally mounts the limiting lever 23 with a projection 23a engageable with the detent 12a. The limiting lever 23 acts to limit the swinging movement of the first change lever 12 for shifting the taking lens system into the telephotographic mode and is urged to turn in the clockwise direction by a coil spring 23c as shown in FIG. 5. The end 23d of the limiting lever 23 is disposed in the path of the off-set pin 14c of the shift control cam 14 and is pushed by pin 14c to swing in the counterclockwise direction through a certain angle upon the rotation of the shift control cam 14. Thus, when the shift control cam 14 turns, the off-set pin 14c causes the limiting lever 23 to swing counterclockwise, thereby disengaging the projection 23a of the limiting lever 23 from the detent 12a of the first change lever 12. The first change lever 12 is accordingly allowed to swing in the direction to shift the taking lens system into the telephotographic mode.

The first engaging edge 12b is shaped in the form of a quarter of a circle defined by the path of the off-set pin 14c and is brought into contact with the off-set pin 14c when the first change lever 12 is swung in the counterclockwise direction to shift the taking lens into the telephotographic mode. During the time the off-set pin 14c can be brought into contact with the first engaging edge 12b of the limiting lever 12, the shift control cam 14 maintains the first change lever 12 unchanged in position through a first one-fourth rotation thereof and turns the same in the counterclockwise direction after the first one-fourth rotation thereof. The second engaging edge 12e, which is formed as a continuation of the first engaging edge 12b and projects laterally a little more than the first engaging edge 12b, is brought into contact with the off-set pin 14c upon the first change lever 12 turning in the clockwise direction to shift the taking lens into the wide-photographic mode.

Figure 12:
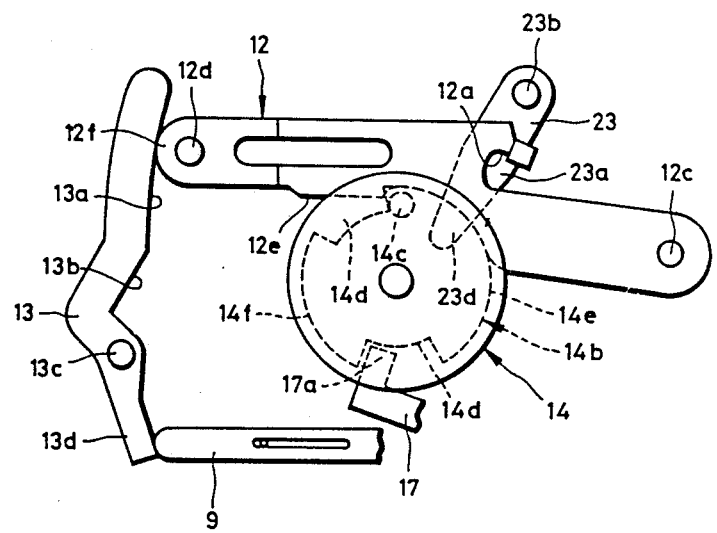
FIG. 12 is a plan view showing the positions of first and second change levers when the camera is in the wide-angle photographic mode.
Figure 13:
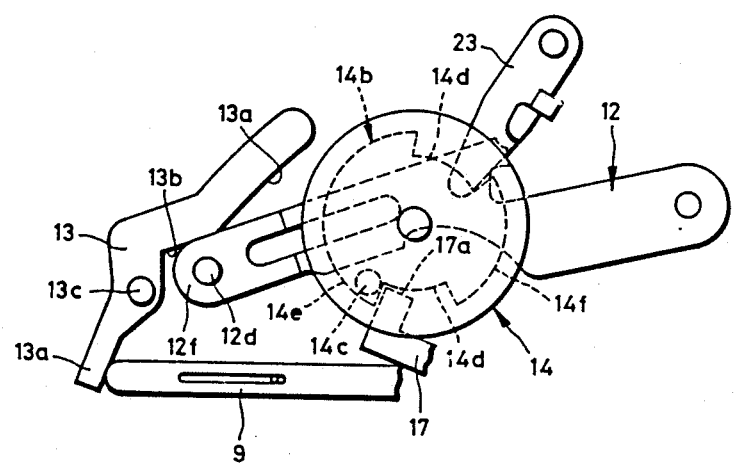
FIG. 13 is a plan view showing the positions of the same said first and second change levers when the camera is in the telephotographic mode.

As is shown in detail in FIGS. 12 and 13, the non-displacing cam section 13a of the second change lever 13 is circularly arcuate and lies on part of a circular path of the end 12f of the first change lever 12 and has a length approximately equal to three-fourths of the whole possible stroke of the first change lever 12 necessary to shift the taking lens system between the telephotographic and wide-angle photographic modes. The displacing cam section 13b, which has a cam surface positioned inside the extended arc of the non-displacing cam section 13a, has a triangular recess to receive therein the end 12f of the first change lever 12. The end 12f of the first change lever 12 is consequently brought into contact with the non-displacing cam section 13a when the first change lever 12 travels three-fourths of its possible stroke. At this time, the first change lever 12 turns alone leaving the second change lever 13 as it is. After the three-fourths travel of the first change lever 12, the end 12f of the first change lever 12 is brought into contact with the displacing cam section 13b, leaving the non-displacing cam section 13a, causing clockwise rotational displacement of the second change lever 13 corresponding to the rotational displacement of the first change lever 12. As a result, the movable lens barrel 1 moves three-fourths of its possible movement in the axial direction, thereby inserting the conversion lens 6 into the optical axis L of the taking lens system.

The switch lever 17 is provided with a hook 17a which is received in the notch 14d of the shift control cam 14 to prevent the shift control cam 14 from rotating, and switching finger 17b for turning off the motor switch 15 upon the hook 17a of the switch lever 17 falling into or being received in the notch 14d of the shift control cam 14. The switch lever 17 is pivotally mounted on a shaft 17c for pivotal movement between an off position wherein the hook 17a of the switch lever 17 is in the notch 17a to turn on the motor switch 16 and to prevent the rotation of the shift control cam 14 and an on position wherein the hook 17a of the switch lever 17 is out of the notch 17a to turn off the motor switch 16 and to allow the rotation of the shift control cam 14. Latch-set lever 18 is engaged with the off-set pin 14c to push the switch lever 17 to the off position and, on the other hand, to turn the switch lever 17 to the on position when operated. To this end, the latch-set lever 18 is provided with a hooked portion 18a for being latched with a latch lever 25 which actually turns the switch lever 17 between the on and off positions, and first and second engaging surfaces 18b and 18c for turning the latch-set lever 18 in the clockwise direction after releasing the latch lever 25 from the hooked portion 18a, thereby latching again the hooked portion 18a with the latching lever 25. The first and second engaging surfaces 18b and 18c are engageable with off-set pin 14c when the taking lens system is shifted into telephotographic mode from the wide-angle photographic mode and to the wide-angle photographic mode from telephotographic mode, respectively.

Latch-set lever 18 disposed under the switch lever 17 is mounted for rotation on the base plate by means of the shaft 17c of the switch lever 17 and is urged or biased in the counterclockwise direction by means of a coil spring 29. Between the switch lever 17 and latch-set lever 18 there is a torsion spring 24 to urge the switch lever 17 toward the off position. The latch lever 25 is urged or biased in the counterclockwise direction by means of a coil spring 25a.

The operating power from the T-W mode shift slider 46 is transmitted to the switch lever 17 by transmitting the movement of the T-W mode set slider 11 in the direction shown by the arrow in FIG. 5 through a transmission lever 26, a set slider 27 to which the transmission lever 26 is attached, the latch lever 25 and the latch-set lever 18.

The transmission lever 26 has a detent 26a engageable with a projection 11a of the T-W mode set slider 11 and is mounted for rotation on the set slider 27 by means of a pivot shaft 26b. The transmission lever 26 is further urged or biased in the clockwise direction by means of a coil spring 26c (see FIG. 5). A releasing pin 30 is mounted on the base plate to swing the transmission lever 26 so as to release the detent 26a from engagement with the projection 11a of the T-W mode set slider 11 when the transmission lever 26 is in engagement with the projection 11a of the T-W mode set slider 11 and moves to the extremity of its movement.

The set slider 27 is mounted on the base plate by means of a pin-and-slot engagement for sliding movement in the direction of sliding movement of the T-W mode set slider 11. The T-W mode set slider 11 and the set slider 27 are both urged or biased in a downward direction as viewed in FIG. 5 by means of coil springs 28 and 29, respectively.

Operation of the focal length changeable camera thus structured will be hereinafter described with reference to the accompanying drawings. In taking a picture with use of the camera as shown in FIG. 1, the lens cover opening slider 42 is moved to open the barrier blades 43 and 44. In cooperation with the opening of the barrier blades 43 and 44, a power switch (not shown) of the camera is turned on to apply electric power to a control circuitry for the motor 15, the shutter 8, an automatic rangefinding device, an electronic flash, etc.

When the barrier blades 43 and 44 are open, the camera is in the wide-angle photographic mode as shown in FIG. 4 and the movable lens barrel 1 is retracted in a moving area of the lens holder 7a. In this wide-angle photographic mode, when the release button 51 is depressed, the automatic rangefinding device is actuated to shift the lens holder 4 along the optical axis L, thereby focusing the master lens 3 on a subject in the field. Thereafter, the shutter 8 is actuated to expose the film 65, and then the motor 15 is actuated to rotate. Rotation of the motor 15 is transmitted to the switching gear arrangement 20 through the reduction gear train G1. Since the switching gear arrangement 20 places the planet gear 20c in mesh with the first follower gear 20d, rotation of the motor 15 is transmitted to the spool gear 67 through the first follower gear 20d and the gear train G2. As a result, the film wind spool 15 is rotated to wind up the exposed part of the film 65 and to withdraw the film 65 from the film patrone 70 to place an unexposed part of the film 65 at the exposure position. The shutter 8 is self-cocked with the film wind-up.

To shift the camera from the wide-angle photographic mode as shown in FIG. 4 to the telephotographic mode as shown in FIG. 3, the T-W mode shift slider 46 is operated. In cooperation with the operation of the T-W mode shift slider 46, the T-W mode set slider 11 is moved upwardly and displaced from a position shown in FIG. 6 to a position shown in FIG. 7. The set slider 27 is consequently moved in the same direction through the transmission lever 26 in engagement with the projection 11a of the T-W mode set slider 22. Accordingly a projection 27c of the set slider 27 faces the cutaway 17d of the switch lever 17 to allow counterclockwise rotation of the switch lever 17.

Through the projection 27a of the set slider 27, the latch lever 25 is turned in the clockwise direction to release the engagement between the latch lever 25 and the latch-set lever 18, thereby causing the latch-set lever 18 to turn in the counterclockwise direction so as to turn switch lever 17 in the counterclockwise direction through the torsion spring 24 stretched between the levers 18 and 25. The hook 17a of the switch lever 17 leaves the notch 14d of the shift control cam 14 to turn on the motor switch 16, actuating the motor 15. When the plate gear 20c moves around the sun gear 20a and is brought into mesh with the second follower gear 20e. Through the intermediate gear train 21, rotation of the motor 15 is transmitted to the shift control cam 14 to turn it in the clockwise direction.

Figure 7:
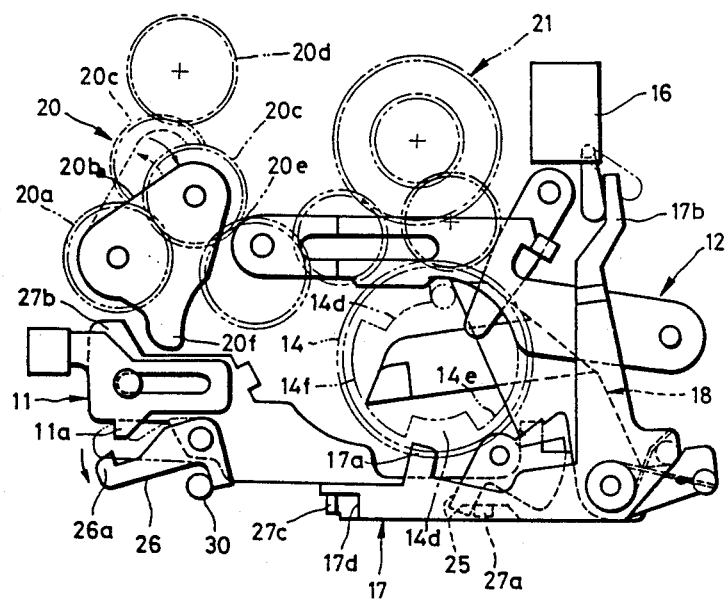
FIGS. 7 through 11 are plan views showing the mode shift operation of the mode shift mechanism of the focal length changeable camera of FIG. 5.

FIG. 7 shows the T-W mode set slider 11 at the extremity of its movement. There, the transmission lever 26 abuts against the releasing pin 30 projecting from the base plate, having been turned in the counterclockwise direction to release or disengage the detent 26a from the projection 11a of the T-W mode set lever 22. Thus, the T-W mode set lever 11 is in a position to return but is prevented from returning fully to its initial position because the projection 27c is engaged with the cutaway 17d of the switch lever 17, which has been turned to the on position. Accordingly, since the projection 27b of the set slider 27 is out of engagement with the detent projection 20f of the carrier 20b of the switching gear arrangement 20, the planet gear 20c is maintained in mesh with the second follower gear 20e. Although the set slider 27 does not completely return to its initial position, the engagement between the transmission lever 26 and the projection 11a of the T-W mode set slider 11 is interrupted, thereby to disconnect the set slider 27 from the T-W mode set slider 11, and accordingly the taking lens system is not periodically shifted between the tele- and wide-angle photographic modes even when the T-W mode shift slider 46 is operated and left in the operated position.

Figure 8:
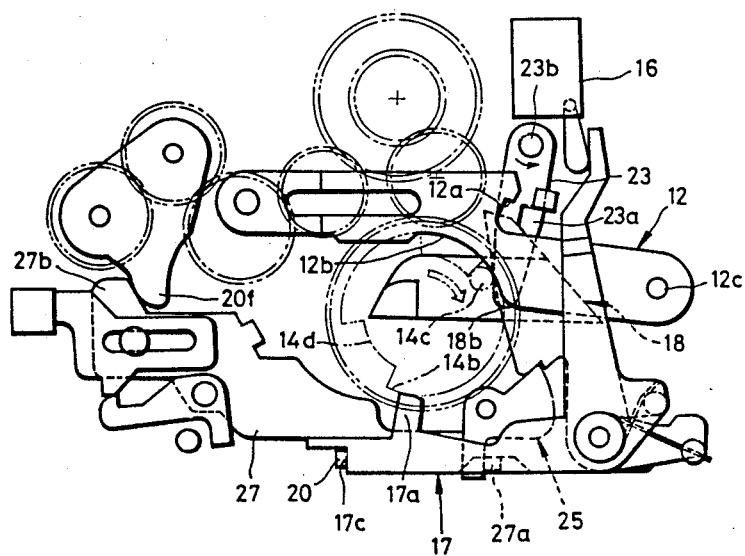

When the shift control cam 14 begins to turn in the clockwise direction, the limiting lever 23 turns in the counterclockwise direction under the influence of the off-set pin 14c as shown in FIG. 8. As a result, the detent 12a of the first change lever 12 is released from the projection 23a of the limiting lever 23 so as to cause the first change lever 12 to turn in the counterclockwise direction about the shaft 12c with the first engaging edge 12b following the off-set pin 14c. However, due to the quartered configuration of the first engaging edge 12b, the first change lever 12 does not return to the telephotographic position until the shift control cam 14 turns one-fourth of its one revolution.

During the first one-fourth revolution of the shift control cam 14, the off-set pin 14c comes into contact with the latch-set lever 18, thereafter turning the latch-set lever 18 in the clockwise direction until it is latched by the latch lever 25 so as to return the latch-set lever 18 to its initial position. Owing to the return of the latch-set lever 18, the spring 24 is biased or charged to urge the switch lever 17 in the clockwise direction. However, at this time, the hook 17a of the switch lever 17 is in engagement with the first cam surface 14e of the circular cam section 14b of the shift control cam 14, and so the switch lever 17 cannot turn in the clockwise direction. As a result, the motor switch 16 is maintained turned on for self-holding during the conversion of the camera into the telephotographic mode from the wide-angle photographic mode.

Figure 9:
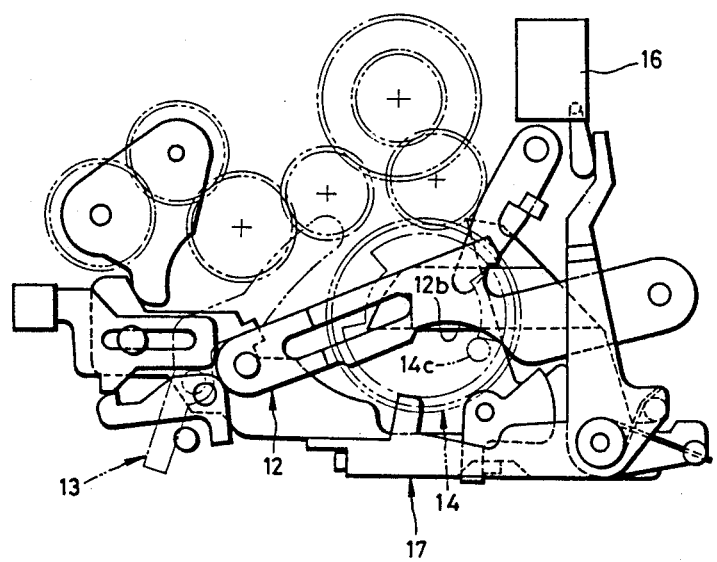

The first change lever 12, as shown in FIG. 9, turns, by means of the coil spring 5, in the counterclockwise direction following the circular movement of the off-set pin 14c caused by angular displacement of the shift control cam 14 more than approximately one-fourth revolution thereof. The movable lens barrel 1 is consequently thrust forward to place the master lens 3 in a position suitable for telephotography. For accurately positioning the movable lens barrel 1 in the telephotographic position, the movable lens barrel 1 is formed with a rear flange 1a abutable against the front wall of the inner housing 55. Upon the abutment of the movable lens barrel 1 against the inner housing 55, the first change lever 12 is prevented from turning further.

As was previously noted, since the end 12f of the first change lever 12 is in contact with the cam surface of the second change lever 13 urged or biased by means of the coil spring 7c, the second change lever 13 turns with the turning of the first change lever 12. However, as shown in FIG. 12, the second change lever 13 does not follow the turning of the first change lever 12; while the first change lever 12 turns through three-fourths of one revolution because the end 12f of the first change lever 1 is in engagement with the non-displacing cam section 13a of the second change lever 13. In the remaining one-fourth revolution of the first change lever 12, the top end 12f of the first change lever 12 faces the displacing cam section 13b of the second change lever 13 and so the second change lever 13 is enabled to turn rapidly about the shaft 13c. Thereafter, the conversion lens shift mechanism 7 acts following the rapid turn of the second change lever 13 to insert the conversion lens 6 into the optical axis L of the taking lens system. This action is effected through the slide lever 9. Because the conversion lens 6 is rapidly inserted into the optical axis L when the master lens 3 is sufficiently far away from the conversion lens 6, the conversion lens 6 is prevented from striking the master lens 3.

Figure 6:
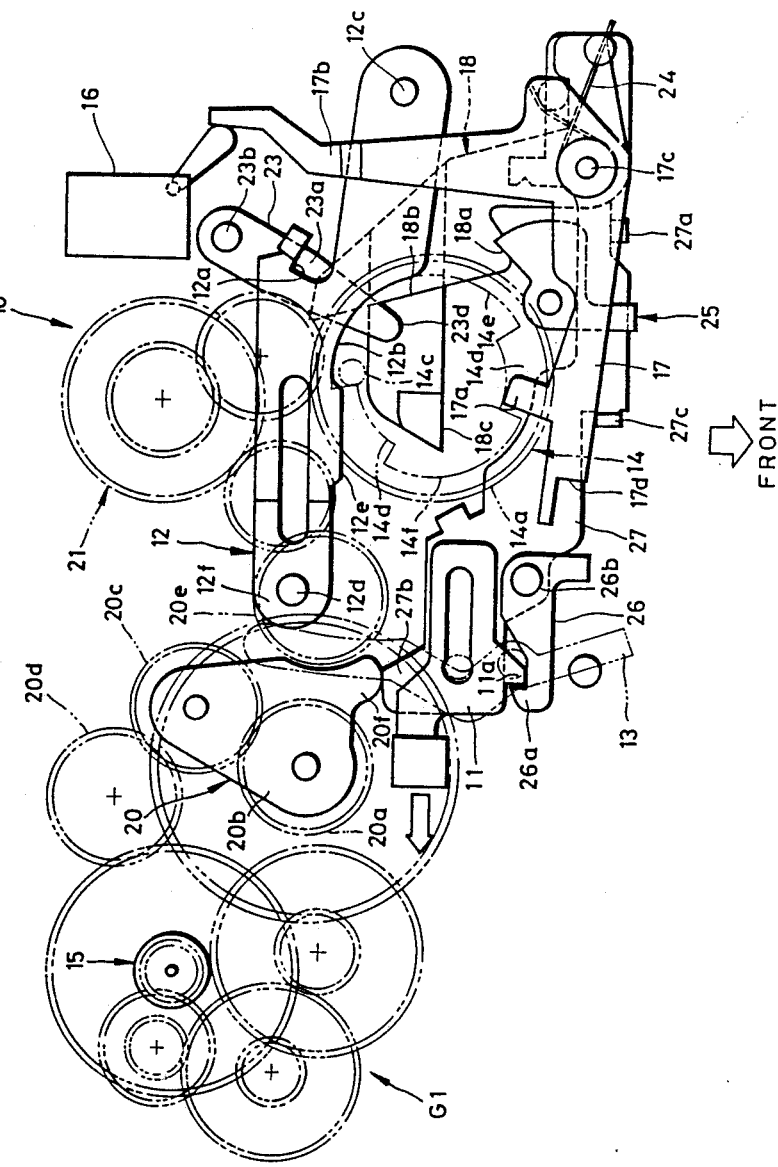
FIG. 6 is a plan view showing the mode shift mechanism of the focal length changeable camera of FIG. 5.
Figure 10:
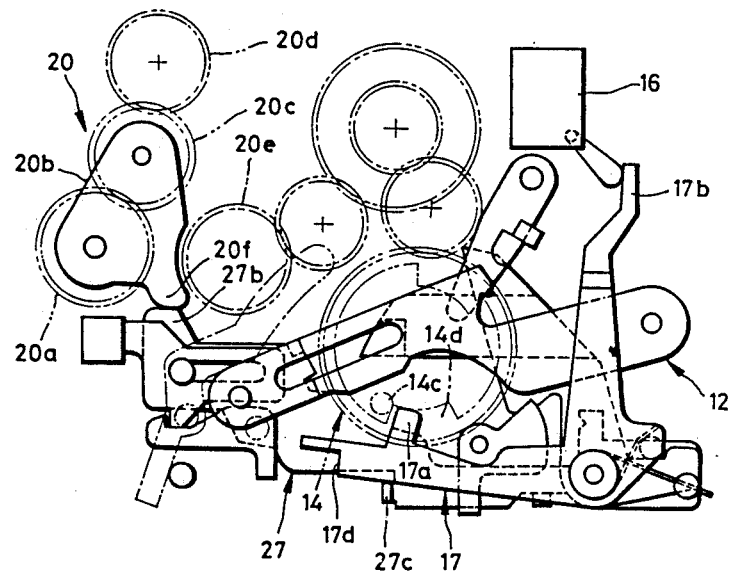

As is shown in FIG. 10, when the shift control cam 14 turns more than a half revolution, the hook 17a of the switch lever 17 falls into one of the notches 14d of the shift control cam 14 to return the switch lever to its initial position, thereby turning off the motor switch 16 to stop the motor 15 and releasing the engagement between the projection 27c of the set slider 27 and the notch 17d of the switch lever 17 so as to return the set slider 27 to its initial position shown in FIG. 6. Thus, the shift gear arrangement 20 has the projection 20f of the carrier 20b pushed with the projection 27b of the set slider 27 to turn the carrier 20b in the counterclockwise direction. The planet gear 20c is accordingly forced to mesh with the first follower gear 20d.

In a manner as described above, the camera is shifted into the telephotographic mode wherein the movable lens barrel 1 is thrust out of the inner housing 55 and the conversion lens 6 is in alignment with the optical axis L as shown in FIG. 3 from the wide-angle photographic mode as shown in FIG. 4, this mode shift operation is effected particularly by making use of the first cam surface 14e of the shift control cam 14. As was previously noted, the first cam surface 14e is longer than the second cam surface 14f. By making use of the difference in length of these first and second cam surfaces 14e and 14f, the limiting lever 23 and the latch-set lever 18 are swung or turned in sequence. This sequential swinging movement makes the motor 15 receive decreased reactive force from the shift control cam 14.

Figure 11:
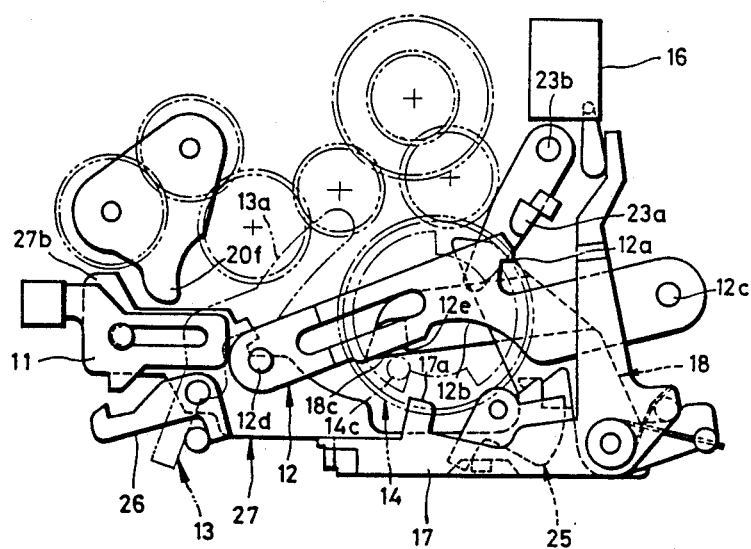

The camera can be shifted into the wide-angle photographic mode from the telephotographic mode in substantially the same manner as described above. When operating the T-W mode shift slider 46, the switch lever 17 is moved out of the notch 14a of the shift control cam 14 to turn on the motor switch 16 as shown in FIG. 11. Simultaneously with this, the T-W mode set slider 11 is disengaged and disconnected from the transmission lever 26 by means of the releasing pin 30, so that no repetitive shifting operation between the telephotographic and the wide-angle photographic mode is induced even when the T-W mode shift slider 46 is left in the operated position.

Rotation of the motor 15 is transmitted to the shift cam through the gear train G1 and the switching gear arrangement 20. At the beginning of rotation of the shift control cam 14, the off-set pin 14c pushes the second engaging surface 18c of the latch-set lever 18 to return it to its initial position as well as to engage it with the latch lever 25. During further rotation of the shift control cam 14, the off-set pin 14c abuts against the second engaging edge 12e to turn the first change lever 12 in the clockwise direction against the coil spring 5, thereby moving the movable lens barrel backward. Simultaneously with this, the first change lever 12 cooperatively turns the second change lever 13 in the counterclockwise direction thereby to remove the conversion lens 6 from the optical axis L through the slide lever 9 and the conversion lens shift mechanism 7 as shown in FIG. 2.

During continuous rotation of the shift control cam 14, the off-set pin 14c forces the first change lever 12 to further rotate in the clockwise direction. At the extremity of clockwise movement of the first change lever 12, the detent 12a of the first change lever 12 rides over the projection 23a of the limiting lever 23 and then engages it as is shown in FIG. 12. Thus, the first change lever 12 is locked with the limiting lever 2 at the telephotographic position and, thereby, prevented from turning further in the counterclockwise direction. The shift control cam 14 can rotate a little more after the lockage of the first change lever 12 to allow the off-set pin 14c to move away from the second engaging edge 12e of the first change lever 12, finally being returned to and placed at a position shown in FIG. 6.

If in fact the shift control cam 14 and the first change lever 12 return to their initial position as shown in FIG. 5, the hook 17a of switch lever 17 falls into the notch 14d of the cam section of the shift control cam 14 to turn off the motor switch 16 and allows the set slider 20 to return to its initial position. Thus, the planet gear 20c is brought out of mesh with the second follower gear 20e and into mesh with the first follower gear 20d. This mode shift is effected by making use of the second cam surface 14f of the shift control cam 14. Since the off-set pin 14c of the shift control cam 14 and the first change lever 12 are brought into contact with each other on the side remote from the pivot shaft 12c of the first change lever 12 when the master lens 3 is shifted from the telephotographic position to the wide-angle photographic position, the first change lever 12 turns with relatively high torque. The first change lever 1 can accordingly be moved with ease against the coil spring 5 which forces the movable lens barrel 1 to move forwardly.

At the completion of exposure of all the exposable frames of the film 65, the motor is automatically reversed in rotation in a manner well known to those skilled in the art to rotate the rewinding gear 68, and hence the hook 69, so as to rewind continuously the exposed film on the spool 15a in the film patrone 70.

It is to be noted that rotation of the shift control cam 14 is stopped through the engagement between the cam surfaces of the shift control cam having different lengths and arranged at unequal spacings and the switch lever as stop means. Because of the different lengths of the cam sections arranged at unequal spacings, the shift control cam rotates intermittently at different intervals. This makes it possible to properly coordinate the various movable levers with the shift control cam, particular to the respective cam sections, at different timings. Accordingly, the output power of the motor can be efficiently used.

Figure 14:
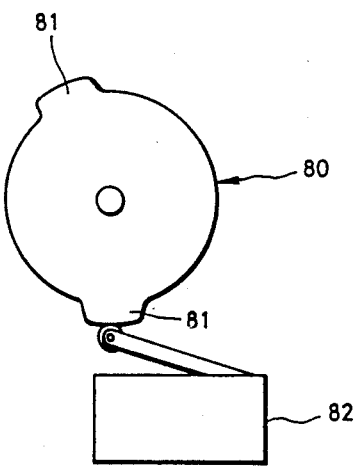
FIG. 14 is a plan view showing an alternative means for displacing a motor switch lever.
Figure 15:
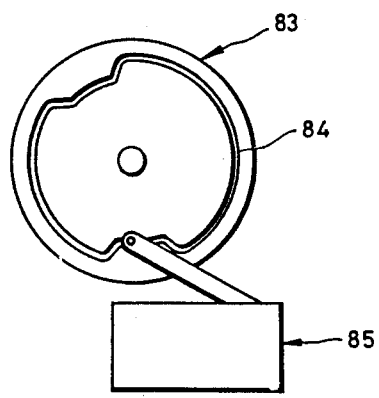
FIG. 15 is a plan view showing another alternative means for displacing a motor switch lever.
Figure 16:
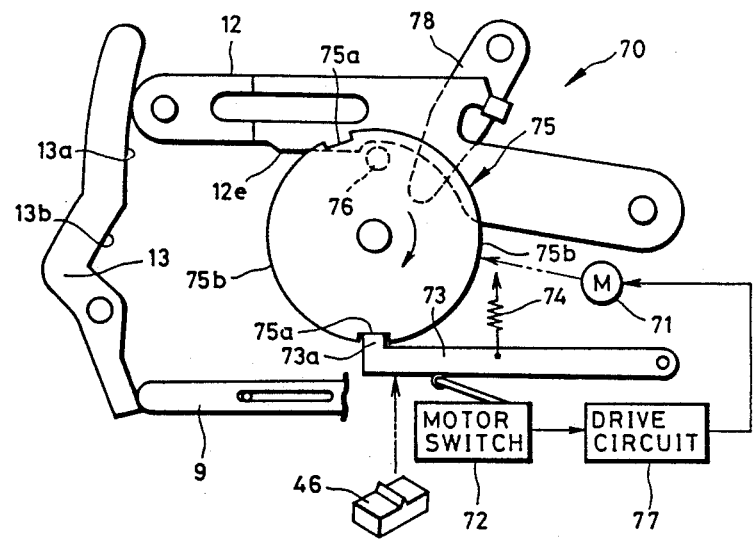
FIG. 16 is a plan view, partially in block diagram, showing a mode shift mechanism of the focal length changeable camera according to another embodiment of the present invention when the camera is in a wide-angle photographic mode.
Figure 17:
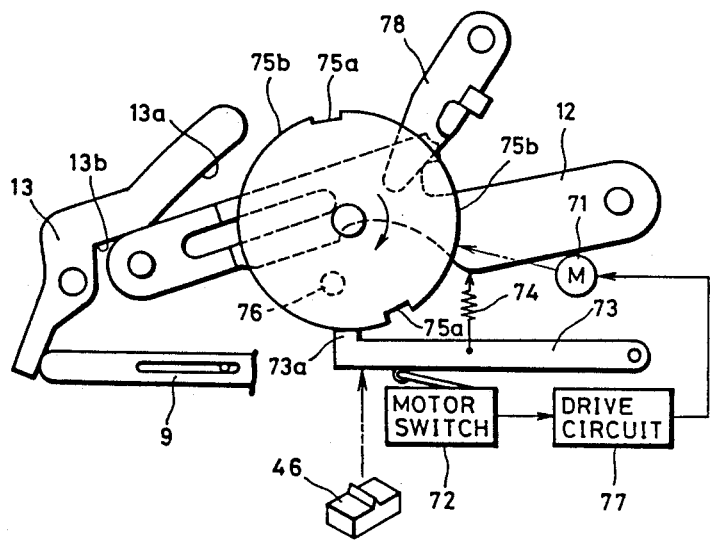
FIG. 17 is a view similar to FIG. 16 but with the parts in a different position.
Figure 18:
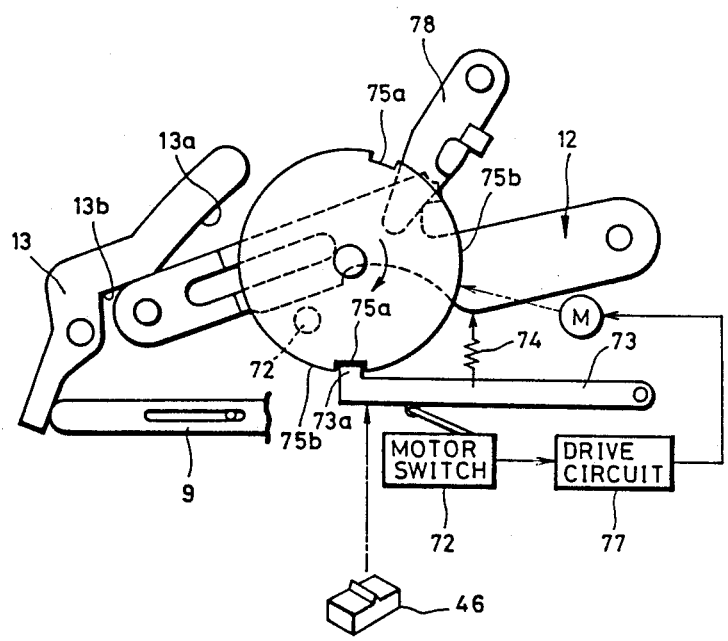
FIG. 18 is a view similar to FIG. 16 but when the camera is in a telephotographic mode.

FIGS. 14 and 15 illustrate alternative embodiments of the shift cam and its associated elements. As shown in FIG. 14, a shift cam 80 is formed with peripheral projections 81 for controlling a motor switch 82 to turn on and off. In FIG. 15, a shift cam 83 is provided with a closed cam groove 84 for controlling a motor switch 85 to turn on and off. The provision of the cam groove 84 enables effecting the turning on and off of the motor switch without the provision of the latch-set lever 18, the latch lever 25, etc. used in the first embodiment.

According to the above embodiment, by sliding the T-W mode set slider 11 in the direction shown by the arrow in FIG. 5, the shift cam 14 can be controlled in rotation through the switch lever 17 in engagement with the shift cam 14 and the latch-set lever 18. Furthermore, owing to the coaction of the switch lever 17 and the latch-set lever 18, the motor switch 16 can be self-held, which ensures shift operation of the camera between the wide-angle and telephotographic modes only upon operation of the T-W mode shift slider 46 and avoids the need for provision of electric self-holding circuits. Furthermore, because switch lever 17 is adapted to turn on the motor switch 16 after the detent 17a of the switch lever 17 has completely left the notch 14d of the shift cam 14, the motor 15 is prevented from starting to rotate during controlled rotation of the shift cam 14 and various operable parts and mechanisms are, therefore, free from undesirable force. This improves the durability of the mechanism.

Referring now to FIGS. 1 to 4 and 16 to 18, which show an alternative embodiment of the present invention, the first change lever 12 coacts with a lever drive mechanism 70. The lever drive mechanism 70 includes a motor 71, a motor switch 72 for starting and stopping the motor 71, a switch activating lever 73 for turning on and off the motor switch 72, a motor control cam 75 which is rotated by the motor 71 and has motor deactuating cam surfaces 75a and motor actuating cam surfaces 20b arranged alternately on the periphery thereof for controlling the switch activating lever 73, and a pin 76 off-set on the back surface of the motor control cam 75. The first change lever 12 directly coacts with the off-set pin 76 to change or shift the taking lens system between the tele- and wide-angle photographic modes. The T-W mode shift slider 46 is operationally linked to the switch activating lever 73 so as to displace it to turn on the motor switch 72. The switch activating lever 73 is urged or biased by a coil spring 74 to turn in the counterclockwise direction as viewed in FIG. 16. A driver circuit 77 is provided to control the motor 71 according to a control signal from the motor switch 72.

A limiting lever 78, coacting with the first change lever 12, is turned in the counterclockwise direction with the off-set pin 76 to allow the first change lever 12 to turn when the motor control cam 75 turns and at other times limits the turning of the first change lever 12. In the same way as described in connection with the previously described embodiment, the first change lever is restrained from turning when moving to shift the taking lens system from the wide-angle photography mode to the telephotographic mode as a result of, for example, the abutment of flange 1a of the movable lens barrel 1 against the inner housing 55.

The focal length changeable camera thus constructed operates as follows:

When taking a picture using the camera shown in FIG. 1, the lens cover opening slider 42 is moved to open the barrier blades 43 and 44. In cooperation with the opening of the barrier blades 43 and 44, a power switch (not shown) of the camera is turned on to apply electric power to the control circuitry for the motor 71, the shutter 8, an automatic rangefinding device, an electronic flash, etc.

With the barrier blades 43 and 44 open, the camera is in the wide-angle photographic mode shown in FIG. 4 and the movable lens barrel 1 is retracted into the area of movement of the lens holder 7a. In this wide-angle photographic mode, when the release button 51 is displaced the automatic rangefinding device is actuated to shift the lens holder 4 along the optical axis L, thereby focusing the master lens 3 on a subject in the field. Thereafter, the shutter 8 is actuated to expose the film (not shown) and then the motor 71 or a film winding motor (not shown) separate from the motor 71 is actuated to wind up the exposed film in a similar manner as described in connection with the previous embodiment, simultaneously with the self-cocking of the shutter 8.

To shift the camera from the wide-angle photographic mode as shown in FIG. 4 to the telephotographic mode as shown in FIG. 3, the T-W mode shift slider 46 is operated. In cooperation with the operation of the T-W mode shift slider 46, the switch activating lever 73 is turned in the counterclockwise direction to turn on the motor switch 72, starting the motor 71 to rotate. The detent end 73a of the switch activating lever 73 consequently leaves the motor deactuating cam surface 75a of the motor control cam 75, allowing the motor control cam 75 to rotate. Then, the detent end 73a of the switch activating lever 73 is brought into and maintained in contact with the motor actuating cam surface 75b of the motor control cam 75. The motor switch 72 is thus maintained turned on. Hence, the motor control cam 75 can rotate continuously even when the T-W mode shift slider 46 is released or returned to its rest position. During the rotation of the motor control cam 75, the off-set pin 76 forces or pushes the limiting lever 78 to turn in the counterclockwise direction as viewed in FIG. 16, allowing the first change lever 12 to turn in the clockwise direction by means of the coil spring 5. Through the pin-slot (12d-1c) engagement, the movable lens barrel 1 is thrust forward. In cooperation with this, the end 12f of the first change lever 12 is adjacent the displacing cam section 13b of the second change lever 13 and thus the second change lever 13 is able to turn rapidly in the clockwise direction about the shaft 13c to shift the slide lever 9. The conversion lens shift mechanism 7 accordingly acts following the rapid turning of the second change lever 13 to insert the conversion lens 6 into the optical axis L of the taking lens system. Because the conversion lens 6 is rapidly inserted into the optical axis L when the master lens 3 is sufficiently far away from the conversion lens 6, the conversion lens 6 cannot strike or hit the master lens 3.

When the T-W mode shift slider 46 is operated again to displace the switch lever 73, the motor switch 72 is turned on, actuating the motor 71 to rotate so as to turn the motor control cam 75. The first change lever 12 is consequently turned in the clockwise direction by means of the off-set pin 76 of the motor control cam 75 to retract the movable lens barrel 1 within the inner housing 55. In cooperation with the retracting movement of the movable lens barrel 1, the conversion lens 6 is displaced from the optical axis L. Thus, the camera is shifted from the telephotographic mode to the wide-angle photographic mode.

At the completion of exposure of all the exposable frames of the film, the motor is automatically reversed in rotation in a manner well known to those skilled in the art to rotate the rewinding gear with a hook connected to a spool of a film patrone so as to rewind continuously the exposed film on the spool in the film patrone.

It is preferred to provide the focal length changeable camera, constructed as above and shown in FIGS. 1 to 4, with means or a mechanism for preventing shutter operation and mode shift operation from being effected simultaneously. To this end, there is provided an interlock mechanism for interlocking the shutter release mechanism and the focal length changing mechanism, shown in FIGS. 19 through 22. The interlock mechanism includes a body release member displaced in cooperation with the shutter button 51. The body release member comprises a primary slidable lever 120 and a secondary slidable lever 121. A lock lever 123 is displaceable upon sliding movement of the secondary lever 120. Lever 123 releasably engages a shutter actuating lever 124 for causing a shutter driving device 122 well known in the art to effect an exposure. The interlock mechanism further includes a mode shift lever 125 which is slidable upon operation of the T-W mode shift slider 46, an interlock lever 126 displaceable upon displacement of the mode shift lever 125, and a T-W mode set slider 11 for operationally connecting or interlocking the interlock lever 126 to the mode shift mechanism 10.

The primary and secondary slidable levers 120 and 121 are formed with slots 120a and 121a extending in the direction of their movement, these slots receiving guide pins 120b and 121b by which they are slidable relative to a base plate (not shown) and being connected with each other by a coil spring 131. The primary slidable lever 120 is urged or biased by a coil spring 119 normally to move toward the upper left as viewed in FIG. 19. According to the above lever arrangement, the depression of the shutter button 51 causes the primary slidable lever 120 to move downwardly followed by the secondary slidable lever 121 connected to the primary slidable lever 120 through the coil spring 131. When the secondary slidable lever 121 moves downwardly, a lug or detent 133 of the secondary slidable lever 121 abuts a pin 132 mounted on the look lever 123.

The primary slidable lever 120 has a film winding interlock lever 134 pivotally mounted thereon by means of the guide pin 120b and coacts with a film rewinding mechanism 135 well known in the art. The film winding interlock lever 134 can turn in the counterclockwise direction as viewed in FIG. 19 while the film rewinding mechanism 135 is in operation, bringing its end recess 134a into engagement with a lug or detent 126a of the interlock lever 126 so as to be thereby restrained against movement. In this way, mode shift of the camera between the tele- and wide-angle photographic modes is prevented during the rewinding of an exposed film.

The secondary slidable lever 121 is formed with a notch 121c in a side edge thereof. A release lock lever 136 coacts with the lens cover opening slider 42 and is formed with a hook 136a at its end which is brought into engagement with the recess 121c of the secondary slidable lever 121 when the lens cover opening slider 42 is not operated, to maintain the barrier blades 43 and 44 closed. The secondary slidable lever 121 accordingly does not coact with the shutter release button 51 during the engagement of the release lock lever 136 therewith, thereby preventing the shutter 8 from operating. Since the release lock lever 136 is operated to turn in the clockwise direction following the operation of the lens cover opening slider 42 for opening the barrier blades 43 and 44 and thereby disengaging the hook 136a of the release lock lever 136 from the notch 121c of the secondary slidable lever 121, the secondary slidable lever 121 can move. The depression of the shutter button 51 causes the lock lever 123 to move through the primary and secondary slidable levers 120 and 121 so as to actuate the shutter driving device 122.

The mode shift lever 125 is supported for sliding movement in the sliding direction of the secondary slidable lever 12 by the guide pins 121b. The mode shift lever 125 is formed with a limiting detent 125a for allowing the clockwise motion of the interlock lever 126 which is caused when the T-W mode shift slider 46 is operated.

The interlock lever 126 is biased in the clockwise direction by means of a spring 126b and is formed with an arm 126c which is brought into engagement with the limiting detent 125a of the mode shift lever 125 to restrain rotation of the interlock lever 126 and is further provided with first and second limiting edges 129 and 130. The first limiting edge 129, extending radially, is brought into engagement with a projection 137 of the secondary slidable lever 121 when the secondary slidable lever 121 moves downward to restrain clockwise rotation of the interlock lever 126 during the depression of the shutter release button 51 and guides the projection 137 of the secondary slidable lever 121 to move in a radial direction of the interlock lever 126. The second limiting edge 130, extending about a portion of the periphery of lever 126, is brought into engagement with a projection 137 of the secondary slidable lever 121 when the interlock lever 126 rotates in the clockwise direction in cooperation with the downward movement of the mode shift lever 125 to restrain downward movement of the secondary slidable lever 121 during the mode shift operation of the T-W mode shift slider 46. The second peripheral limiting edge 130 is shaped as part of a circle having its center at the pivot pin 121b of the interlock lever 126 and extends from the first radial limiting edge 129.

Figure 19:
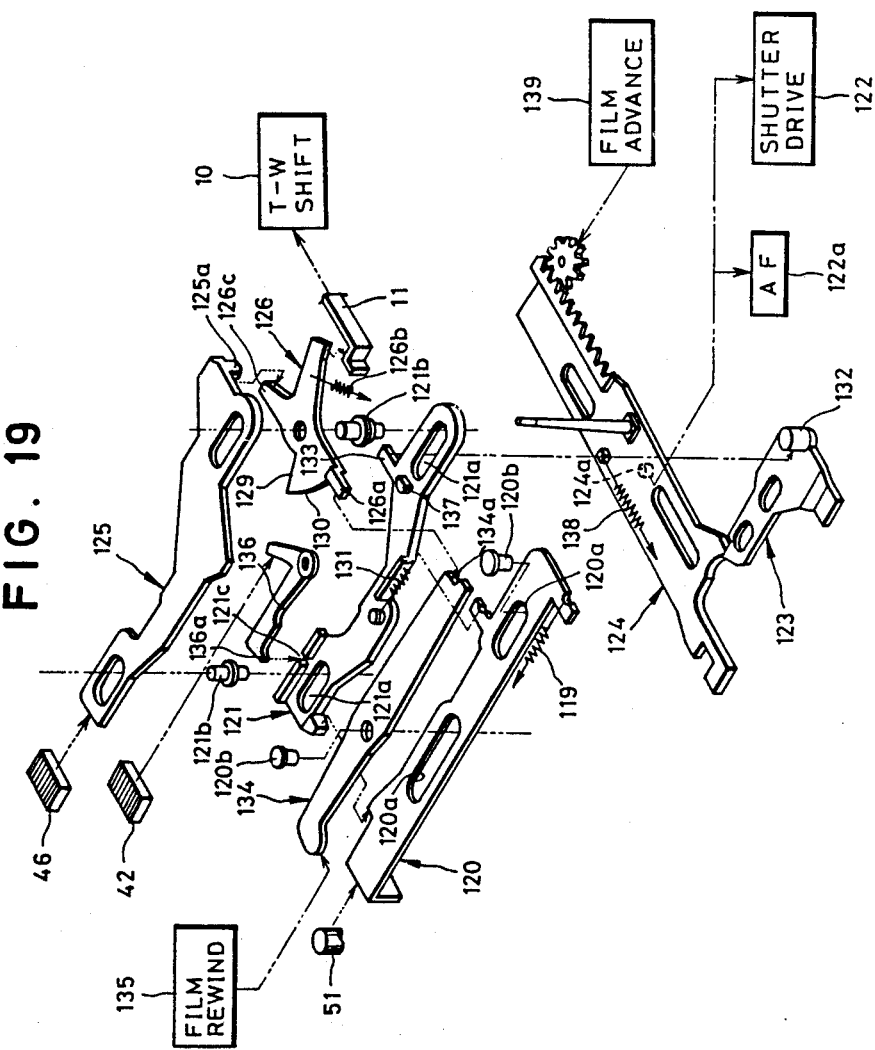
FIG. 19 is an exploded perspective view showing an interlock mechanism according to the present invention.

The shutter actuating lever 124 is biased toward the left as viewed in FIG. 19 by means of a spring 138 but slides toward the right following a one-frame advance of the film by a film advancing mechanism 139 to tension the spring 138, thereby charging the shutter actuating lever 124. The shutter actuating lever 124, when fully charged, is retained by lock lever 123. The shutter actuating lever 124 is provided with a pin 124a mounted thereon which triggers an automatic focusing device 122a and then the shutter driving device 122 upon the shutter actuating lever 124 being released and moving rapidly.

The operation of the focal length changeable camera thus constructed will be hereinafter described with reference to FIGS. 1 to 4 and 19 to 22. If the barrier blades 43 and 44 are both closed, the release lock lever 136 is in a position wherein the hook 136a of the release lock lever 136 is in engagement with the notch 121c of the secondary slidable lever 121 and the secondary slidable lever 121 cannot slide downward even if the primary slidable lever 120 is moved downward as a result of the depression of the shutter release button 51, so that the shutter 8 is not actuated.

When taking a picture with the camera, the lens cover opening slider 42 is moved to open the barrier blades 43 and 44. In cooperation with the opening of the barrier blades 43 and 44, a power switch (not shown) of the camera is turned on to apply electric power to a control circuit. At this time, the secondary lever 121 and the release lock lever 136 are disengaged from each other to ready the camera for actual use.

When the barrier blades 43 and 44 are open, the camera is in the wide-angle photographic mode as shown in FIG. 4 and the movable lens barrel 1 is retracted into the space in which the lens holder 7a can move. In this wide-angle photographic mode, the primary and secondary slidable levers 120 and 121 move downward to push down the lock lever 123. As a result, the automatic focusing (AF) device is actuated to shift the lens holder 4 along the optical axis L, thereby focusing the master lens 3 on a subject in the field. Thereafter, the shutter 8 is actuated to expose the film, and then the film advancing motor is actuated to rotate the film winding spool so as to wind up the film and to withdraw an unexposed part of film from the film patrone in order to place an unexposed part of the film in the exposure position.

To shift the camera from the wide-angle photographic mode as shown in FIG. 4 to the telephotographic mode as shown in FIG. 3, the T-W mode shift slider 46 is operated. In cooperation with the operation of the T-W mode shift slider 46, the mode shift lever 125 is moved downward. The interlock lever 126 is turned in the clockwise direction by the spring 126b following the motion of the limiting detent 125a of the mode shift lever 125, causing T-W mode set slider 11 to move toward the right. The mode shift mechanism 10 is accordingly actuated to shift the camera from the wide-angle photographic mode to the telephotographic mode.

If the shutter release button 51 is depressed while the T-W mode shift slider 46 is operated, the second limiting edge 130 of the interlock lever 126 is engaged with the projection 137, moving the primary slidable lever 120 downward against the spring 131 but restraining further downward movement of the secondary slidable lever 121. This prevents the lock lever 123 from moving downward so as not to allow the shutter driving device 122 to operate. Therefore, the shutter 8 can be prevented from operating even though the shutter release button 51 is depressed during the operation of the T-W mode shift slider 46.

Figure 22:
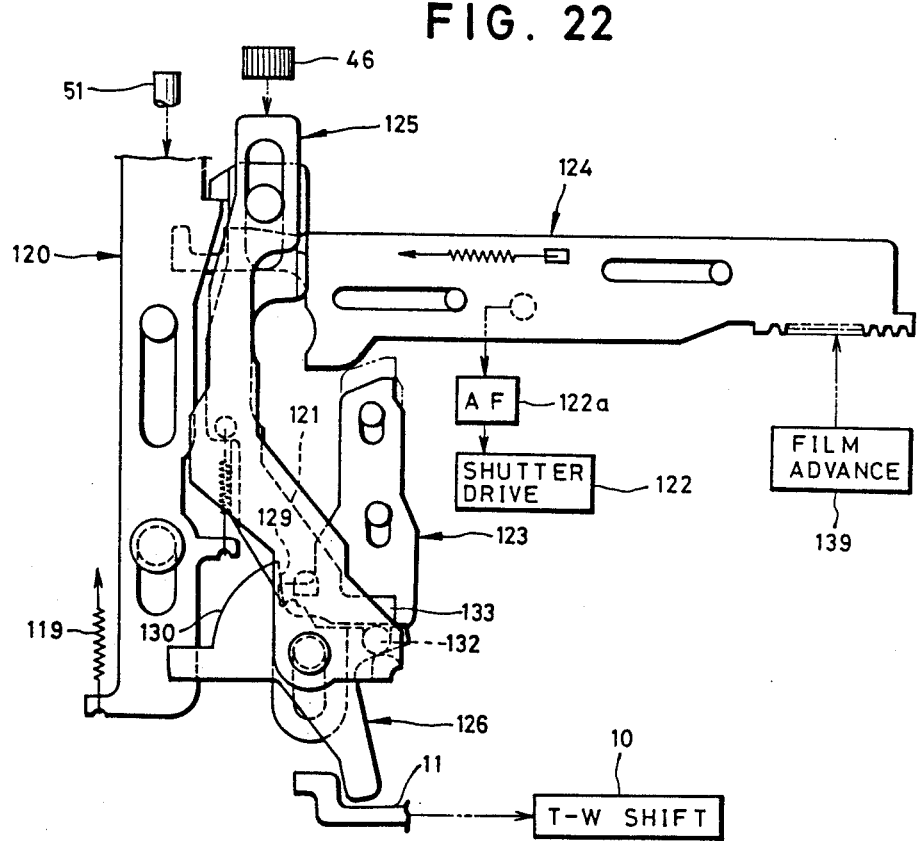
FIG. 22 is a front view similar to FIG. 20 in which a mode shift mechanism is operated.

As is shown in FIG. 22, since secondary slidable lever 121 moves downward during the depression of the shutter release button 51, the interlock lever 126 is prevented from rotating in the clockwise direction through the engagement of the first limiting edge 129 of the interlock lever 126 with the projection 137 of the secondary slidable lever 121, thereby preventing the interlock lever 126 from following the downward movement of the mode shift lever 125 caused as a result of the operation of the T-W mode shift slider 46 during the depression of the shutter release lever 51. The T-W mode set slider 11 cannot move, which prevents the mode shift of the camera. Thus, the camera can be prevented from shifting in mode even when the T-W mode shift slider 46 is operated, while the shutter release button 51 is depressed.

Figure 20:
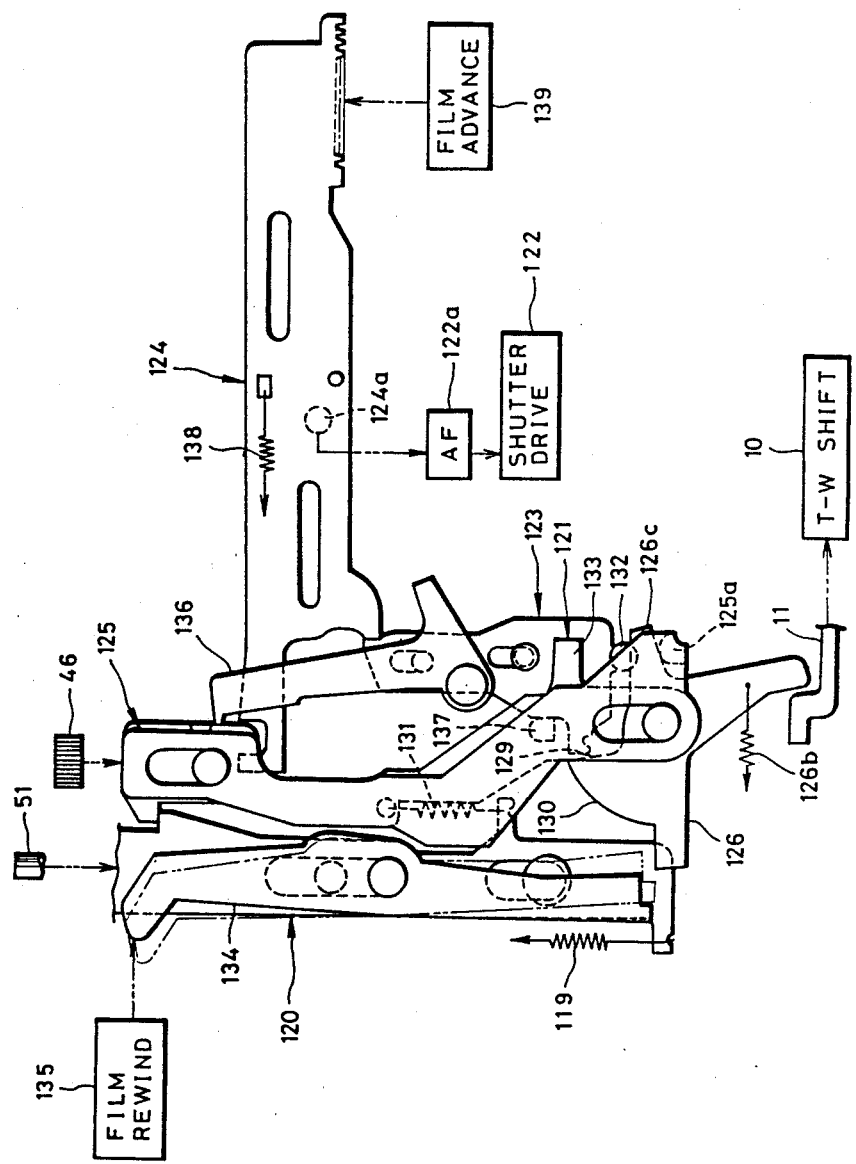
FIG. 20 is a front view showing the interlock mechanism of FIG. 19.
Figure 21:
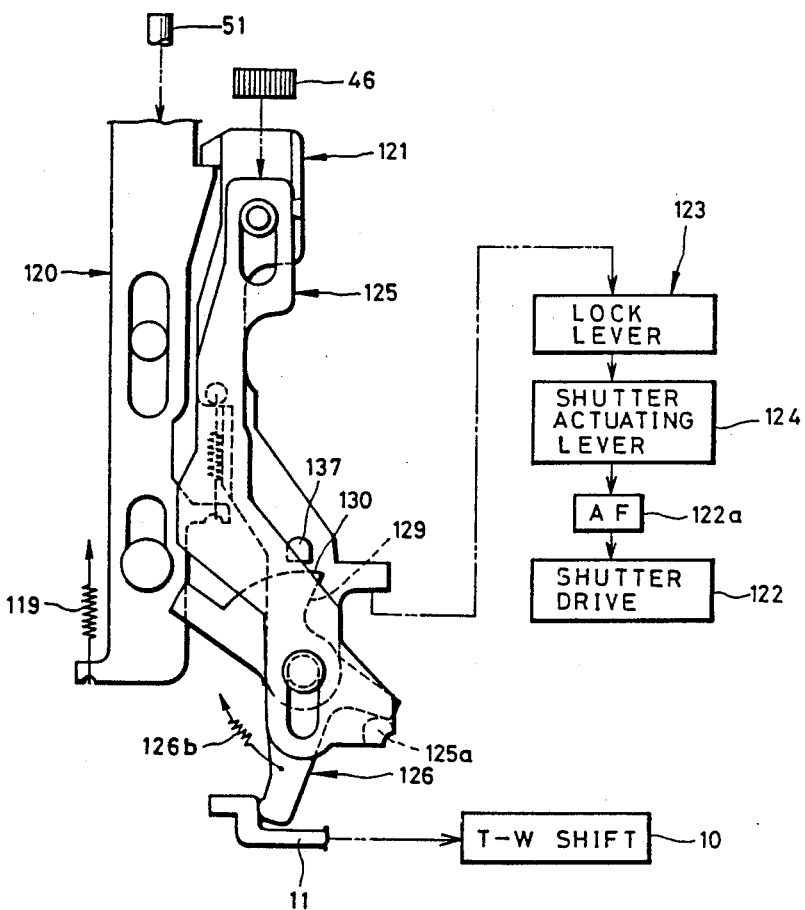
FIG. 21 is a front view similar to FIG. 20 but after a release button has been operated.

At the completion of exposure of all the exposable frames of the film, the motor is automatically reversed in rotation in the same manner as described in connection with the previous embodiments to rotate the rewinding gear with a hook connected to the spool of the film patrone so as to rewind continuously the exposed film o the spool in the film patrone. As is shown in FIG. 20, during this film rewinding, since the film winding interlock lever 134 rotates counterclockwise to engage the detent 126a of the interlock lever 126 with its recess 134a, so as thereby to be prevented from rotating, the mode shift operation is interlocked during film winding.

Although in this embodiment the body release member consists of a double-lever structure including the primary and secondary slidable levers 120 and 121 connected to each other by means of the spring 131 and is constructed to allow only the primary slidable lever 120 to move when the shutter release button 51 is accidentally depressed while the T-W mode shift slider 46 is operated, the body release member may instead consist of a single slidable member.

What is claimed is:

1. A focal length changeable camera with a taking lens system which is driven by a motor and is changed to provide at least two different focal lengths, namely, relatively long and relatively short, said camera comprising:
   a motor switch for turning on and off said motor;
   rotatable changing means driven by said motor;
   lever displacing means provided on said rotatable changing means;
   a motor switching lever engageable with said lever displacing means for switching said motor switch; and
   a focal length changing member for changing the focal length of said taking lens system upon rotation of said rotatable changing means.

2. A focal length changeable camera as defined in claim 1, wherein said taking lens system includes a master lens movable in the direction of the axis of the taking lens system upon changing the focal length of the taking lens system and a conversion lens inserted in the axis of said taking lens system upon changing the focal length of said relatively long focal length.

3. A focal length changeable camera as defined in claim 1, wherein said focal length changing member is a lever and said rotatable changing means is a cam member provided with a pin mounted thereon, said pin being engageable with said lever to turn said lever.

4. A focal length changeable camera as defined in claim 3, wherein said lever displacing means comprises a plurality of notches formed on the periphery of said cam member at regular spacings; a latch set lever disposed in the path of movement of said pin and being pushed by said pin to move to a latching position; a latch lever for latching said latch set lever when said latch set lever is at said latching position; a photographic mode change lever for releasing said latch lever upon changing said focal length of said taking lens system; and a biasing spring disposed between said latch set lever and said motor switching lever for biasing said motor switch lever to leave said notch upon said latch lever being released and to fall into said notch upon said latch set lever being latched by said latch lever.

5. A focal length changeable camera as defined in claim 1, wherein said lever displacing means comprises a cam groove formed in said rotatable changing means.

6. A focal length changeable camera as defined in claim 1, wherein said lever displacing means comprises projections formed on a peripheral surface of said rotatable changing means.

7. A focal length changeable camera with a taking lens system which is driven by a motor to change focal length between at least two different focal lengths, namely, relatively long and relatively short, said camera comprising:
   a motor switch for turning on and off said motor;
   a motor switch actuating member for causing said motor switch to turn on and off said motor;
   a motor control cam member driven by said motor and having activating peripheral cam sections for displacing said motor switch actuating member to activate said motor switch to turn on said motor and deactivating peripheral cam sections for displacing said motor switch actuating member to deactivate said motor switch to turn off said motor;
   a control member provided on said motor control cam member;
   a focal length changing member cooperative with said control member for changing said taking lens system in focal length; and
   an externally operable focal length changing member for displacing said motor switch actuating member from a position wherein said motor switch actuating member is out of contact with said activating cam section to a position wherein said motor switch actuating member is in contact with said activating cam section.

8. A focal length changeable camera as defined in claim 7, wherein said control member is a pin off-set on said motor control cam member and said focal length changing member is a lever movable upon circular movement of said off-set pin.

9. A focal length changeable camera with a taking lens system which is driven by a motor to change focal length between at least two different focal lengths, namely, relatively long and relatively short, said camera comprising:
   a member movably mounted on the camera and manipulable by a user from outside the camera to move said member to an operating position for actuating said motor to cause said changing of focal length of said taking lens system;
   means for preventing said taking lens system from being again changed in focal length after said changing of focal length of said taking lens system has once been caused and while said manipulable member is maintained in said operating position;
   a first operating member movable in cooperation with the first-mentioned said member, said first operating member being provided with an engaging portion;
   a detent member engageable with said engaging portion of said first operating member, said detent member being disengaged from said engaging portion of said first operating member at a position near an extremity of movement of said first operating member;
   a second operating member supporting said detent member and movable with said first operating member by said detent member;
   motor switching means for starting said motor to cause said changing of focal length of said taking lens system upon said second operating member being moved, said switching means stopping said motor upon completion of said changing of focal length of said taking lens system; and
   biasing means for returning said first and second operating members to their initial positions.

10. A focal length changeable camera as defined in claim 9, wherein said first operating member is a first slider producing rectilinear movement in cooperation with said the first mentioned member and said second operating member is a second slider producing rectilinear movement parallel to said first slider.

11. A focal length changeable camera as defined in claim 9, wherein said detent member is a lever pivotally mounted on said second member which abuts against a pin near said extremity of movement of said first operating member to turn so as to disengage said engaging portion of said first operating member from said detent member.

12. A focal length changeable camera as defined in claim 9, wherein said taking lens system has master lens means movable in the direction of the axis of said taking lens system upon changing said taking lens system in focal length and conversion lens means inserted into said axis upon changing said taking lens system to said relatively long focal length.

13. A focal length changeable camera equipped with a motor for driving a focal length changing mechanism to change a taking lens system of said camera between at least two different focal lengths, namely, relatively long and relatively short, said camera comprising:
   a rotatable cam member driven by said motor;
   a plurality of cam sections formed on a periphery of said cam member and disposed at unequal spacings;
   stopping means engageable with said cam sections for stopping rotation of said rotatable cam member when brought into engagement with said cam section;
   a push member mounted on said cam member off-set from the axis of rotation of said cam member; and
   a changing member pivotally mounted for rotation in cooperation with said push member to change said taking lens system between said at least two different focal lengths.

14. A focal length changeable camera as defined in claim 13, wherein said taking lens system has master lens means movable in the direction of the axis of said taking lens system upon changing said taking lens system in focal length and conversion lens means inserted into said axis upon changing said taking lens system to said relatively long focal length.

15. A focal length changeable camera as defined in claim 14, wherein said changing member is urged against said rotatable cam member by means of a biasing member for urging said master lens means to move to change said taking lens system to said relatively long focal length.

16. A focal length changeable camera as defined in claim 15, wherein said changing member is brought into engagement with said push member of said rotatable cam member near a pivot point of said changing member when changing said taking lens system from said relatively long focal length to said relatively short focal length.

17. A focal length changeable camera as defined in claim 13, wherein said cam section comprises a notch and said stopping means comprises a motor switch lever having one end engageable with said notch, a motor switch for turning on said motor upon said one end being brought into engagement with said notch and turning off said motor upon said one end being brought out of said notch; a latch set lever disposed in the path of movement of said push member and being pushed by said push member to move to a latching position; a latch lever for latching said latch set lever when said latch set lever is in said latching position; a photographic mode change lever for releasing said latch lever which is latched upon changing said focal length of said taking lens system; and a biasing spring disposed between said latch set lever and said motor switching lever for biasing said motor switch lever to leave said notch upon said latch lever being released and to fall into said notch upon said latch set lever being latched by said latch lever.

18. A focal length changeable camera equipped with a rotatable motor of which the transmission of rotation is selectively connected through a clutch mechanism to a film transporting system for transporting a film and a focal length changing system for changing the focal length of a taking lens system between at least different two focal lengths, namely, relatively long and relatively short, said camera comprising:
- rotatable means disposed in said focal length changing system and driven by said motor;
- a push member mounted on said rotatable means;
- a focal length changing member in contact with said push member and moved by said push member according to movement of said push member caused by rotation of said rotatable means to change said taking lens system between said two different focal lengths; and
- load prevention means for preventing said rotatable means from receiving load from said focal length changing member when said rotatable means is at an initial position before said transmission of rotation of said motor is connected to said focal length changing system from said film transporting system.

19. A focal length changeable camera as defined in claim 18, wherein said taking lens system has master lens means movable in the direction of the axis of said taking lens system upon changing said taking lens system in focal length and conversion lens means inserted into said axis upon changing said taking lens system to said relatively long focal length.

20. A focal length changeable camera as defined in claim 18, wherein said rotatable means comprises a cam member, said push member is an off-set pin mounted on said cam member, and said focal length changing member is a lever pivotally mounted to be moved with said off-set pin.

21. A focal length changeable camera as defined in claim 20, wherein said load prevention means is a change cam with backlash provided between said off-set pin and said pivotally mounted lever.

22. A focal length changeable camera as defined in claim 20, wherein load prevention means is change cams with backlash provided between said off-set pin and said pivotally mounted lever and between said off-set pin rotationally moved with said off-set pin for releasing said engagement of said pivotally mounted lever, respectively.

23. A focal length changeable camera with a taking lens system which is driven by a motor to change focal length between at least two different focal lengths, namely, relatively long and relatively short, said camera comprising:
- a member movably mounted on the camera and manipulable by a user from outside the camera to move said member to an operating position for actuating said motor to cause said changing of focal length of said taking lens system;
- means for preventing said taking lens system from being again changed in focal length after said changing of focal length of said taking lens system has once been caused and while said manipulable member is maintained in said operating position;
- wherein said motor switching means includes a switch for turning on and off said motor, a cam member driven by said motor, and a switch level which causes said switch to turn on said motor in cooperation with said second operating member and to turn off said motor through an engagement with said cam member after said changing of focal length of said taking lens system.

* * * * *